Patented Aug. 31, 1943

2,328,465

UNITED STATES PATENT OFFICE 2,328,465

METALLIFEROUS SUBSTANTIVE DYESTUFFS

Georges Kopp, Paris, France; vested in the Alien Property Custodian

No Drawing. Application March 6, 1940, Serial No. 322,623. In Great Britain March 28, 1939

6 Claims. (Cl. 8—42)

The direct dyeing of natural or regenerated cellulosic fibres in shades fast to light has recently made great progress by the introduction of substantive metal azo complexes. Such products have been obtained by metallisation of substantive azo dyestuffs derived from diphenyl bases of the type 4:4'-diamino diphenyl. It is known that certain amongst these polyazo dyestuffs, dye cotton directly in yellowish brown shades fast to washing and light. Their constitution approaches in general the following scheme:

X being a coupling component carrying an ortho hydroxy carboxylic grouping, Y being a sulphonated monoazo dyestuff capable of coupling with the intermediate body

and capable of forming complexes with polyvalent metals, and D being an azotized diphenyl base of the type of benzidine. The base may be either diazotized or tetrazotized.

The dyestuffs of this type dye cotton yellowish brown and it had not been hitherto found possible to obtain purple browns without injury being done to the essential dyeing properties.

It has been found that purple browns of great interest are obtained by choosing as Y component, a compound of the following type:

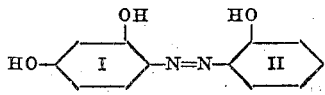

the radical II being substituted by a nitro group, and one of the radicals I and II carrying an SO₃H group.

Certain of the dyestuffs of this constitution dye cellulosic fibres, such as cotton or viscose, purple brown. When the nitro group occurs in the o position, relative to the OH group, the resistance to light is sharply increased relative to the corresponding dyestuffs deprived of this substituent.

The metallisation of these dyestuffs can be done under various conditions of reaction medium, temperature, duration and pressure. The metallising agents taking part in this reaction can be finely divided metals, oxides, hydroxides, salts of inorganic or organic acids or metallic oxide complexes, such as ammoniacal cupric oxide or Fehling's solution.

The invention is illustrated in the following examples:

Example 1

There is prepared according to the usual method, an intermediate body with the help of 184 parts of benzidine and 140 parts of salicylic acid. Into this intermediate body there is run rapidly the monoazo dyestuff prepared by coupling in presence of sodium carbonate the diazo compound of 6 nitro-2-aminophenol-4-sulphonic acid (234 parts) with 110 parts of resorcinol. Stir at low temperature until the first compound (benzidine→salicylic acid) has completely disappeared. A solution of 300 parts of crystallised copper sulphate is added and the mixture heated to 90° C. for one hour.

The dyestuff is isolated by filtration and dried. This dyestuff dyes cotton in a bath of sodium carbonate purple brown shades very fast to light. Its excellent affinity for cellulosic fibre allows of obtaining the dark brown colours termed "negro's head."

The non-nitrated dyestuff, already previously described, gives browns which are too yellowish. Its tinting with the help of blue black or violet colours gives shades approximating those of the new dyestuff of this example, without however, attaining its brightness and its excellent fastness to light, nor its good yield.

The above dyestuff can be equally well isolated before the treatment with sulphate of copper, the latter can be incorporated after drying the dyestuff, or fixed by a subsequent treatment of the dyeings. The properties of the dyeing will vary according to the quantity of copper sulphate used.

Example 2

There is prepared according to the usual technique a diazotized intermediate body, starting from 212 parts of tolidine (4:4'-diamino-3:3'-dimethyl-diphenyl) and 152 parts of 3-methyl-2-hydroxy benzoic acid.

There is prepared on the other hand, a monoazo dyestuff starting with 234 parts of 6-nitro-2-amino phenol-4-sulphonic acid and 110 parts of resorcinol. This dyestuff is isolated by salting out. The dyestuff paste is diluted in 3000 parts of water and 1500 parts of 20% ammonia, the suspension is boiled and a solution of 350 parts of crystallised copper sulphate in 2000 parts of warm water added. The cupriferous dyestuff is isolated by salting out and filtration. It is diluted in 5000 parts of cold water.

The suspension of cupriferous dyestuff is allowed to flow into a suspension of the above intermediate product, and the whole stirred until the intermediate body disappears. It is heated to 50° C., the excess of alkali neutralised by acetic acid, and the dyestuff isolated by addition of salt, filtration and drying. The dry product is ground with suitable quantities of carbonate of soda and if desired, pyrophosphate of soda.

The dyestuff thus obtained dyes cotton very purple brown, and is very resistant to light and to washing. Its great resistance to light renders it particularly interesting for obtaining fashionable and very bright tones on hosiery thread.

The resistance to light is still further improved when the dyeings are made in an excess of sulphate or other salt of copper added to the dye bath, for example after the exhaustion of the dye.

*Example 3*

The salicylic acid in Example 2 is replaced by an equivalent quantity of ortho-cresotinic acid. The intermediate compound thus obtained is coupled with the metalliferous complex resulting from the action of 100 parts of copper sulphate, 100 parts of nickel sulphate, and 50 parts of cobalt nitrate on the monoazo dyestuff obtained by coupling the diazo compound of 234 parts of 6-nitro-2-amino-phenol-4-sulphonic acid with 110 parts of resorcinol.

The dyestuff isolated in the usual manner dyes vegetable fibres violet brown shades, very fast to light. The shades and properties of the new dyestuffs can be modified by replacing the copper salts (on the whole or partly) with salts of other polyvalent metals or with a mixture of these salts fixed on the dyestuffs in nature or on the fibre.

I declare that what I claim is:

1. Process for making purplish brown dyestuffs which consists in metallising dyestuffs of the general formula

where D is a disazotized diphenyl base of the benzidine type, X is a coupling component having a carboxylic group ortho to a hydroxy-group and being a member of the benzene series, and Y is the dyestuff component of the general formula:

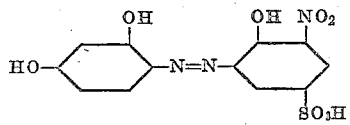

the diphenyl base being coupled at the resorcinol group of said Y component.

2. Process of making purplish brown dyestuffs of the type as set forth in claim 1 which consists in tetrazotising the diphenyl base D and coupling with the components X and Y.

3. Process for obtaining purplish brown shades which consists in metallising on the fibre dyestuffs of the general formula

where D is a disazotized diphenyl base of the benzidine type, X is a coupling component having a carboxylic group ortho to a hydroxy-group and being a member of the benzene series, and Y is the dyestuff component of the general formula:

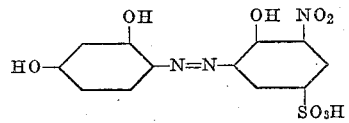

the diphenyl base being coupled at the resorcinol group of said Y component.

4. Process for making purplish brown dyestuffs which comprises diazotising a diphenyl base of the benzidine type, coupling with a coupling component having a carboxylic group ortho to a hydroxy-group and being a member of the benzene series, and diazotising the product and coupling same with the metallised dyestuff component of the general formula:

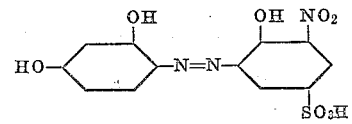

the diphenyl base being coupled at the resorcinol group of said Y component.

5. Process of making purplish brown dyestuffs which comprises metallising with a plurality of salts of different metals dyestuffs of the general formula

where D is a disazotized diphenyl base of the benzidine type, X is an aromatic coupling component having a carboxylic group ortho to a hydroxy-group and being a member of the benzene series, and Y is a dyestuff component of the general formula:

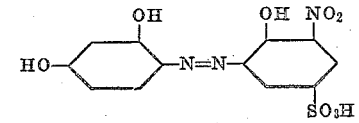

the diphenyl base being coupled at the resorcinol group of said Y component.

6. Process for making purplish brown dyestuffs which comprises diazotising a diphenyl base of the benzidine type, coupling with a coupling component having a carboxyl group ortho to a hydroxy-group and being a member of the benzene series, and diazotising the product to obtain an intermediate compound; preparing a monoazo dyestuff by coupling the diazo compound of 6-nitro-2-amino-phenol-4-sulphonic acid with resorcinol; and coupling said monoazo compound with the intermediate compound.

GEORGES KOPP.